(No Model.)
S. K. HITCHCOCK.
CAR FENDER.
No. 574,733. Patented Jan. 5, 1897.
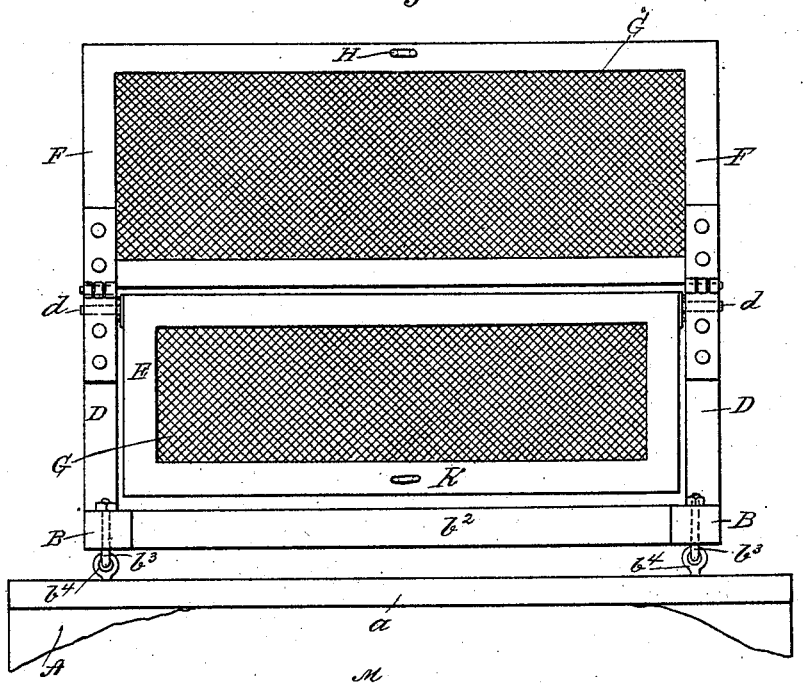
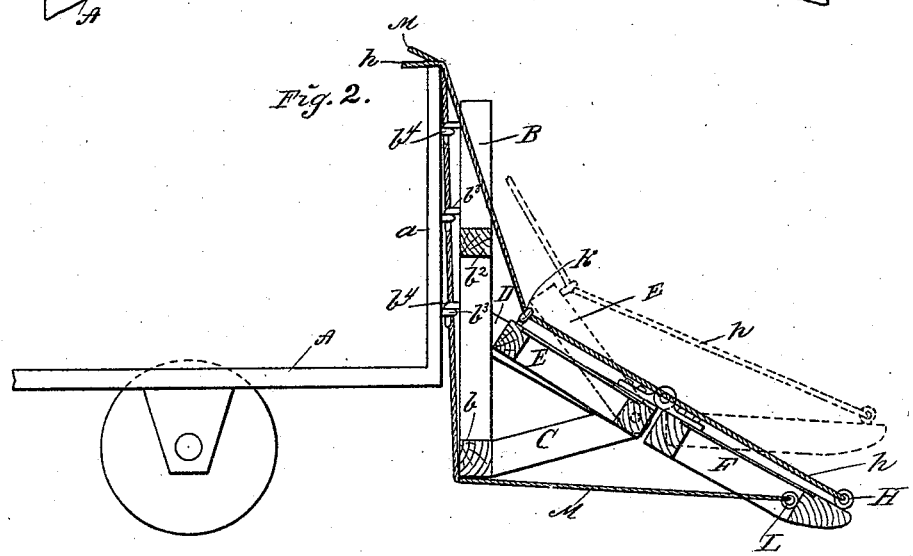
WITNESSES:
INVENTOR
Stephen K. Hitchcock
BY
Edgar Tate & Co
ATTORNEYS

UNITED STATES PATENT OFFICE.

STEPHEN KNOWLTON HITCHCOCK, OF FAIR HAVEN, NEW YORK.

CAR-FENDER.

SPECIFICATION forming part of Letters Patent No. 574,733, dated January 5, 1897.

Application filed February 28, 1896. Serial No. 581,116. (No model.)

*To all whom it may concern:*

Be it known that I, STEPHEN KNOWLTON HITCHCOCK, a citizen of the United States, and a resident of Fair Haven, in the county of Cayuga and State of New York, have invented certain new and useful Improvements in Fenders or Guards for Tramway-Cars, of which the following is a specification, reference being had to the accompanying drawings, forming a part thereof, in which similar letters of reference indicate corresponding parts.

This invention relates to fenders or guards for tramway-cars, and the object thereof is to provide an improved device of this class which is simple in construction and operation, and which is adapted to prevent the serious and sometimes fatal results which frequently follow the striking of a person or object by a car when in motion.

The invention is fully disclosed in the following specification, of which the accompanying drawings form a part, in which—

Figure 1 is a plan view of the dashboard of a car and my improved fender or guard connected therewith; and Fig. 2, a side view of the platform of the car, showing also the end of the dashboard and a vertical transverse section of my improved fender or guard.

In the drawings forming part of this specification, A represents the platform of a car, and $a$ the dashboard thereof, and in the practice of my invention I provide a fender or guard which is of the following construction.

Connected with the dashboard of the car is a main vertical frame which is composed of vertical end bars B, a bottom cross-bar $b$, and a central cross-bar $b^2$, and the frame B is provided with hooks or projections $b^3$ at its back, by which it is connected with staples or rings $b^4$, which are secured to the dashboard of the car. Secured to the lower corners of the vertical frame are forwardly and upwardly directed bars C, to the outer ends of which are secured backwardly and upwardly directed bars D, which are also connected with the vertical end bars B of the main frame, and pivoted between the outer ends of the bars C and D, as shown at $d$, is a supplemental frame E, and hinged to the bars D is an auxiliary frame F, which is adapted to project in front of the main frame and the supplemental frame E and in a downwardly direction.

The body portions of the supplemental frame E and the auxiliary frame F are composed of wire mesh or similar material, as shown at G, and connected centrally with the forward part of the auxiliary frame F at H is a rope, cord, or chain $h$, which extends backwardly through an eye or loop K, which is connected centrally with the rear part of the supplemental frame E and is passed upwardly over the dashboard, and connected centrally with the forward part of the auxiliary frame at L is a similar rope, cord, or chain M, which extends beneath the bottom of the main vertical frame and up over the dashboard.

The rods, cords, or chains $h$ and M may be provided with pulleys where they come in contact with the separate parts of the fender or guard and also where they cross the dashboard, and the operation will be readily understood from the foregoing description when taken in connection with the accompanying drawings and the following statement thereof.

The operation of my improved car-fender, taken in connection with the above description and accompanying drawings, may be briefly stated as follows: The normal position of the fender is that shown in full lines in Fig. 2. The rods, cords, or chains $h$ and M are led up to the dashboard and secured loosely thereto, the cord E passing over the fender, while the cord M is passed up under the fender. When in use, the cord $h$ is allowed to be slack, while the cord M is held taut. When an obstacle is struck, the motorman instantly releases the rope or cord M and pulls up on the cord $h$, which throws the fender in the position shown in dotted lines in Fig. 2. It will thus be seen that it is a matter of impossibility for an object or person being struck running in danger of being thrown against the dashboard of the car or under the wheels of the same.

This device is simple in construction, and it is also strong and durable and is well adapted to accomplish the result for which it is intended; and, as will be apparent, my improved fender or guard may be moved from one end of the car to the other whenever desired, the main upright frame being detachably connected with the dashboard.

It is also apparent that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. The combination with the dashboard of a car of a fender or guard detachably connected therewith, and comprising a main upright frame having forwardly-directed bars or frames connected with the ends thereof at its lower side, a supplemental frame, the outer side of which is pivoted between said bars, and an auxiliary frame hinged to said bars and projected in front thereof, and means for operating said supplemental and auxiliary frames, consisting of a rope, cord or chain which is secured to the central outer part of the auxiliary frame and passed backwardly and connected with the central inner portion of the supplemental frame, and a similar rope, cord or chain which is secured to the central outer portion of the auxiliary frame and passed backwardly beneath the main upright frame each of said ropes, cords or chains being passed over the dashboard, or connected therewith, whereby both of the frames of the fender are raised or lowered, substantially as shown and described.

2. The combination with the dashboard of a car of a fender or guard, detachably connected therewith, and comprising a main upright frame having forwardly-directed bars or frames connected with the ends thereof at its lower side, a supplemental frame, the outer side of which is pivoted between said bars of an auxiliary frame hinged to said bars and projected in front thereof, and means for operating said supplemental and auxiliary frames, consisting of a rope, cord or chain which is secured to the central outer part of the auxiliary frame and passed backwardly and connected with the central inner portion of the supplemental frame and a similar rope, cord or chain which is secured to the central outer portion of the auxiliary frame and passed backwardly beneath the main upright frame each of said ropes, cords or chains being passed over the dashboard, or connected therewith, whereby both of the frames of the fender are raised or lowered, and the body portion of the supplemental and auxiliary frames being composed of wire mesh or similar material, substantially as shown and described.

In testimony that I claim the foregoing as my invention I have signed my name, in presence of the subscribing witnesses, this 25th day of February, 1896.

STEPHEN KNOWLTON HITCHCOCK.

Witnesses:
RILEY H. LYON,
JABEZ CARTER, Jr.